April 10, 1951     O. H. PEARSON     2,548,320
SHEARS
Filed May 13, 1950
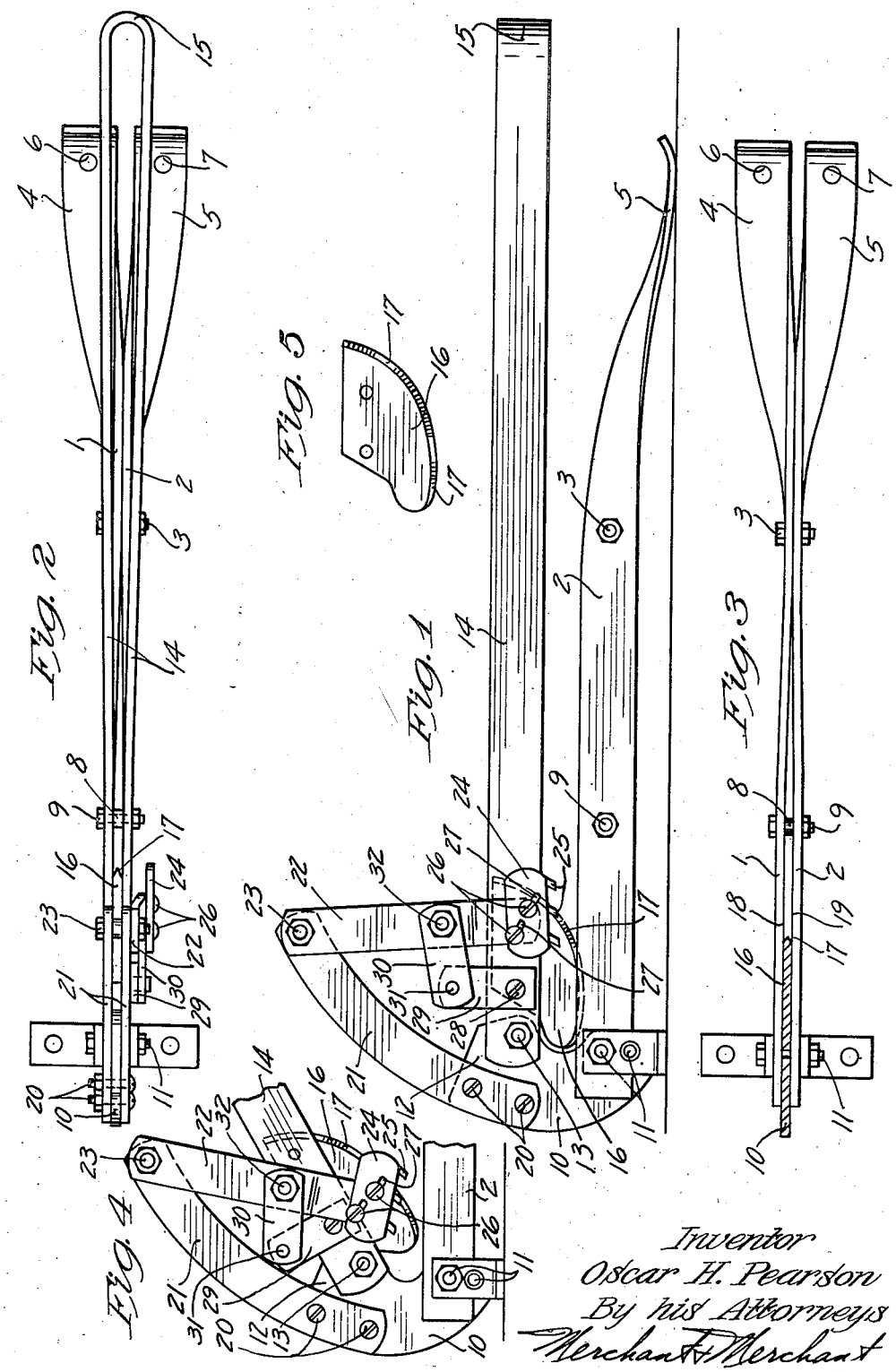
Inventor
Oscar H. Pearson
By his Attorneys
Merchant & Merchant Patented Apr. 10, 1951

2,548,320

UNITED STATES PATENT OFFICE 2,548,320

SHEARS

Oscar H. Pearson, Lake Villa, Ill.

Application May 13, 1950, Serial No. 161,851

2 Claims. (Cl. 164—42)

My invention relates to shears of the type utilized in the cutting of non-metallic sheet material such as asbestos sheets, composition shingles, wall board, and the like, and is in the nature of an improvement upon shears of the type disclosed in my United States Patent No. 2,496,018.

In the cutting of such materials, the shearing knife proper is relatively short in length as compared to the elongated lever-acting handle to which it is secured. The longitudinal extent of the cut or bite made by the knife during each stroke is relatively small; and it is extremely important that the sheet material be fed or advanced at a proper rate. Manual feeding is frequently unsatisfactory in that the material is either advanced too rapidly or too slowly.

With this in mind, it is the primary object of my invention to provide sheet material feeding means in combination with my novel shears, whereby the sheet material will be advanced precisely the desired extent in the direction of the shearing knife upon upward withdrawing movements or strokes thereof.

More particularly, the object of my invention is the provision of a novel tooth-equipped feeding means connected to and controlled by movements of the shearing knife, which will impart the desired extent of forward feeding movement to the sheet material being cut upon the upward withdrawing movement or stroke of the shearing knife and which will withdraw upwardly with respect to said sheet material upon each successive downward cutting movement or stroke of said shearing knife.

Another object of my invention is the provision of a device of the class above-described, which has a minimum of moving parts, which is durable in use, which is inexpensive to construct, and which is automatic and positive in its operation.

The above and still further objects of my invention will become apparent from the following detailed specification, appended claims, and attached drawings.

Referring to the drawings, wherein like characters indicate like parts throughout the several views:

Fig. 1 is a view in side elevation of my novel device;

Fig. 2 is a top plan view thereof;

Fig. 3 is a view similar to Fig. 2 but with the shearing blade being shown in a vertical position and cut away;

Fig. 4 is a fragmentary view corresponding to Fig. 1 but showing a different position of some of the parts thereof; and Fig. 5 is a view in side elevation of the shearing knife of my novel structure.

Referring with greater particularity to the drawings, the numerals 1 and 2 indicate a pair of matched elongated bars forming a relatively fixed body and which are rigidly fastened together at their intermediate portions by any suitable means such as a screw-threaded nut and bolt indicated, in its entirety, by the numeral 3. As shown, those portions of bars 1 and 2 forwardly of the rigid connection 3 are vertically-arranged, whereas those portions to the rear of the connection 3 are twisted to a horizontal position and are in the nature of spaced balancing feet 4 and 5 having apertures 6 and 7 respectively therein for the purpose of receiving nails, screws, or the like to fasten them securely to the floor or other object, if desired. As shown, members 1 and 2 diverge slightly in a forward direction from connection 3 to a point where a spacer washer 8, cooperating with a nut-equipped bolt or the like 9 which passes therethrough, retains them in a definite spaced relationship. From the spacer washer 8 forwardly, the body members 1 and 2 are maintained in a parallel relationship by means of bracket member 10 interposed between the extreme forward ends of the body members 1 and 2 and rigidly held in position by rivets or the like 11. As shown, the bracket member 10 is in the nature of an extension of the fixed body and has an upwardly-projected portion 12, to the opposite sides of which are pivotally secured, as indicated at 13, a handle 14, preferably and as shown, formed from a single length of steel stock bent upon itself as at 15. Rigidly secured between the opposite sides of the handle 14, immediately behind the pivot 13, is a shearing knife or blade 16, the cutting edge 17 of which works into and out of the space between the spaced shearing edges 18 and 19 provided by the spaced parallel forward ends of the fixed body members 1 and 2. The shearing knife 16 is of a thickness to work snugly between said shearing edges 18 and 19.

Rigidly secured by means of nut-equipped bolts 20 to the upwardly-projected portion 12 of the bracket member 10 forwardly of the pivot connection 13 is an arm 21 which projects upwardly and rearwardly and terminates at its free end in overhanging spaced relation to the shearing knife 16 rearwardly of the pivot 13. A lever 22 is pivotally connected at its upper end, as indicated at 23, to the rearwardly-projected end of the arm 21. The lower end of the lever 22 terminates adjacent one side of the shearing knife 16 in vertically-spaced relation to the shearing edges 18 and 19. Adjustably secured to the lower end of the lever 22 is a plate 24 provided at its lower edge with downwardly and forwardly-projecting teeth 25. Adjustment is secured by means of screws 26 which are slidably received within slots 27 in the plate 24.

Operatively associated with the knife 16 and connected thereto by means of a nut-equipped screw 28, which projects therethrough and through the opposite sides of the handle member 14, is a lug 29, which projects upwardly between the pivot 13 and the lever 22. A link 30 is pivotally connected at one end to the upwardly-projected end of lug 29, as indicated at 31, and at its opposite end to the intermediate portion of lever 22, as indicated at 32.

Feeding movements to a piece of wall board or the like, interposed between the handle 14 and the fixed body members 1 and 2, will be imparted by the teeth 25 during the withdrawal or upstroke of the handle 14 and cutting and shearing knife 16, as indicated in Fig. 4. As there shown, upward movement of the handle 14 and shearing blade 16 causes forward movement of the plate 24 and downward movement of the lower end thereof, thereby causing the rear teeth to dig into the wall board sufficiently to advance same. Conversely, cutting movements of the handle 14 and shearing blade 16, as indicated in Fig. 1, cause rearward movements of the lower end of the lever 22 and an elevating of the rear teeth 25, so as to cause withdrawal thereof from the wall board.

My invention has been thoroughly tested and found to be completely satisfactory for the accomplishment of the above objects; and, while I have shown a commercial embodiment of my novel structure, it should be obvious that the same is capable of modification without departure from the spirit and scope of the appended claims.

What I claim is:

1. A shear for non-metallic sheet material comprising an elongated relatively fixed body having laterally-spaced parallel shearing edges, a shearing knife pivoted to the forward end of said relatively fixed body for pivotal movements into and out of the space between said spaced shearing edges, said shearing knife being of a width to work snugly between the spaced shearing edges of said body, said fixed body forwardly of the pivotal connection of said knife being provided with an arm which projects upwardly and rearwardly and terminates in overhanging spaced relation to said knife rearwardly of the pivot, a lever pivotally connected at its upper end to the free end of said arm, the lower end of said lever terminating adjacent one side of said knife in vertically-spaced relation to the shearing edges of said body and there provided with forwardly and downwardly - extended material-feeding teeth, said knife being provided with a lug which projects upwardly between said pivot and said lever, and a link pivotally secured at one end to the upper end of said lug and at its other end to the intermediate portion of said lever, downward cutting movements of said knife causing rearward withdrawing movements of said teeth from the material being cut and upward withdrawing movements of said knife causing forward feeding engagement between said teeth and said material.

2. The structure defined in claim 1 in which said teeth are adjustably secured to said lever.

OSCAR H. PEARSON.

No references cited.